US012611631B2

(12) United States Patent
Ito

(10) Patent No.: US 12,611,631 B2
(45) Date of Patent: Apr. 28, 2026

(54) HOLLOW FIBER MEMBRANE MODULE

(71) Applicant: NOK CORPORATION, Tokyo (JP)

(72) Inventor: Yosuke Ito, Kikugawa (JP)

(73) Assignee: NOK CORPORATION, Tokyo (JP)

( * ) Notice: Subject to any disclaimer, the term of this patent is extended or adjusted under 35 U.S.C. 154(b) by 316 days.

(21) Appl. No.: 18/282,960

(22) PCT Filed: May 17, 2022

(86) PCT No.: PCT/JP2022/020494
§ 371 (c)(1),
(2) Date: Sep. 19, 2023

(87) PCT Pub. No.: WO2022/255086
PCT Pub. Date: Dec. 8, 2022

(65) Prior Publication Data
US 2024/0181395 A1 Jun. 6, 2024

(30) Foreign Application Priority Data

Jun. 2, 2021 (JP) ................................. 2021-092809

(51) Int. Cl.
B01D 53/22 (2006.01)
B01D 53/26 (2006.01)
(Continued)

(52) U.S. Cl.
CPC ........... B01D 63/02 (2013.01); B01D 53/268 (2013.01); H01M 8/04149 (2013.01);
(Continued)

(58) Field of Classification Search
CPC .............. B01D 53/268; B01D 2257/80; B01D 2313/04; B01D 63/02; B01D 2053/224; H01M 8/04149
See application file for complete search history.

(56) References Cited

U.S. PATENT DOCUMENTS

| | | | | |
|---|---|---|---|---|
| 2,850,890 A | * | 9/1958 | Rubenstein | B28B 11/04 264/261 |
| 4,289,623 A | | 9/1981 | Lee | |

(Continued)

FOREIGN PATENT DOCUMENTS

| | | |
|---|---|---|
| JP | H02-059016 A | 2/1990 |
| JP | 2002-303435 A | 10/2002 |

(Continued)

*Primary Examiner* — Anthony Shumate
(74) *Attorney, Agent, or Firm* — Harness, Dickey & Pierce, P.L.C.

(57) ABSTRACT

A hollow fiber membrane module 10 includes: a plurality of hollow fiber membranes 200; a case 100 that accommodates the plurality of hollow fiber membranes 200 and has a case main body 110 made of a resin and having openings at both ends thereof; and a pair of sealing and fixing portions 310 and 320 that seal a gap between the hollow fiber membranes in a state where a hollow inside of each of the hollow fiber membranes 200 is kept open and fix the plurality of hollow fiber membranes 200 to the case 100 on both end sides of the case 100. In the case main body 110, a reinforcement portion 115 that connects a pair of facing wall surfaces of inner wall surfaces for accommodating the plurality of hollow fiber membranes 200 is integrally provided on the pair of wall surfaces.

6 Claims, 6 Drawing Sheets

(51) Int. Cl.
  B01D 63/02         (2006.01)
  H01M 8/04119       (2016.01)
(52) U.S. Cl.
  CPC .... *B01D 2053/224* (2013.01); *B01D 2257/80*
      (2013.01); *B01D 2313/04* (2013.01)

(56)                    References Cited

U.S. PATENT DOCUMENTS

| | | | | |
|---|---|---|---|---|
| 4,770,778 A * | 9/1988 | Yokoyama | ........... | B01D 63/023 |
| | | | | 428/394 |
| 5,334,429 A * | 8/1994 | Imoto | ..................... | B29C 63/34 |
| | | | | 428/36.2 |
| 5,472,607 A * | 12/1995 | Mailvaganam | .... | B01D 69/1071 |
| | | | | 210/500.36 |
| 10,583,664 B2 * | 3/2020 | Tanizaki | ................ | B01D 69/08 |
| 2002/0006090 A1 * | 1/2002 | Kawano | .............. | G11B 7/0933 |
| | | | | 369/53.19 |
| 2002/0019448 A1 * | 2/2002 | Sugaya | .................. | C08J 5/2243 |
| | | | | 427/551 |

| | | | | |
|---|---|---|---|---|
| 2003/0012090 A1 * | 1/2003 | Kawano | ............... | G11B 7/0956 |
| | | | | 369/53.19 |
| 2009/0039010 A1 | 2/2009 | Hayashi | | |
| 2011/0204534 A1 * | 8/2011 | Kanemasu | .............. | B29C 43/12 |
| | | | | 425/13 |
| 2012/0270120 A1 | 10/2012 | Kim et al. | | |
| 2013/0153130 A1 * | 6/2013 | Kitagawa | .............. | B29C 70/504 |
| | | | | 156/222 |
| 2016/0194589 A1 * | 7/2016 | Liderfelt | ................ | C12M 29/04 |
| | | | | 435/289.1 |
| 2018/0114619 A1 * | 4/2018 | Kim | ........................ | H01F 10/06 |
| 2019/0015787 A1 | 1/2019 | Oh et al. | | |
| 2020/0353416 A1 | 11/2020 | Enomoto | | |
| 2021/0113967 A1 | 4/2021 | Takeuchi et al. | | |
| 2023/0398748 A1 * | 12/2023 | Dando | ................ | B29C 66/1122 |

FOREIGN PATENT DOCUMENTS

| | | | |
|---|---|---|---|
| JP | 2005-040675 A | | 2/2005 |
| JP | 2015-226859 A | | 12/2015 |
| WO | 2006/112142 A1 | | 10/2006 |
| WO | 2018/190147 A1 | | 10/2018 |
| WO | 2020/026875 A1 | | 2/2020 |

* cited by examiner

HOLLOW FIBER MEMBRANE MODULE

CROSS-REFERENCE TO RELATED APPLICATIONS

This application is a National Stage of International Application No. PCT/JP2022/020494, filed May 17, 2022 (now WO 2022/255086 A1), which claims priority to Japanese Application No. 2021-092809, filed Jun. 2, 2021. The entire disclosures of each of the above applications are incorporated herein by reference.

FIELD

The present disclosure relates to a hollow fiber membrane module applicable to humidifiers and the like.

BACKGROUND

For example, in hollow fiber membrane modules provided in humidifiers for fuel cells, there is a growing demand for high-output systems, and there is a tendency for the hollow fiber membrane modules to be large. In a large-sized hollow fiber membrane module, a pressure of a fluid flowing inside a case is high. Therefore, a large-sized case is generally manufactured by cutting a rigid material such as a metal. In particular, in the case of a box-shaped case, since it is easily deformed by a fluid pressure, it is made of a rigid material such as a metal.

However, manufacturing the case by cutting a rigid material such as a metal increases the cost. Therefore, it is desirable to manufacture the case by resin molding using a mold, but in the case of a large-sized hollow fiber membrane module, as described above, a fluid pressure increases, and thus the case may deform during use. If the case is deformed, there is concern that sealing performance will deteriorate, fluid leakage will occur, and the humidification performance will deteriorate, leading to deterioration in quality.

CITATION LIST

Patent Literature

[PTL 1] WO 2018/190147

SUMMARY

Technical Problem

An object of the present disclosure is to provide a hollow fiber membrane module that can suppress the deformation of a case main body even when the case main body made of a resin is employed.

Solution to Problem

The present disclosure employs the following means to solve the above problems.

That is, a hollow fiber membrane module of the present disclosure includes: a plurality of hollow fiber membranes; a case that accommodates the plurality of hollow fiber membranes and has a case main body made of a resin and having openings at both ends thereof; and a pair of sealing and fixing portions that seal a gap between the hollow fiber membranes in a state, where a hollow inside of each of the hollow fiber membranes is kept open, and fix the plurality of hollow fiber membranes to the case on both end sides of the case, wherein, in the case main body, a reinforcement portion that connects a pair of facing wall surfaces of inner wall surfaces for accommodating the plurality of hollow fiber membranes is integrally provided on the pair of wall surfaces.

According to the present disclosure, since the case main body is provided with the reinforcement portion, even if a fluid pressure in the case main body becomes high, it is possible to suppress the deformation of the case main body.

The reinforcement portion may be provided in a center between one end side and another end side of the case main body.

By employing such a configuration, for example, compared to the case where the reinforcement portion is provided to extend from one end side to the other end side, it is possible to suppress a decrease in the number of hollow fiber membranes to be accommodated in the case main body, it is possible to suppress the obstruction of the flow of the fluid flowing outside the hollow fiber membranes, and it is possible to effectively suppress the deformation of the case main body.

The case main body may include a pair of substantially flat plate portions each provided with at least one through hole, through which a fluid passes, and a pair of curved portions connecting both sides of the pair of substantially flat plate portions, and may be formed of a member, the cross-sectional shape of which perpendicular to a direction from one end side to the other end side of the case main body is an oval shape, and the reinforcement portion may be provided to connect inner wall surfaces of the pair of curved portions.

In general, the case main body having such a shape and made of a resin is easily deformed by a fluid pressure, but as described above, the deformation is suppressed by providing the reinforcement portion.

The reinforcement portion may be provided in a center between the pair of substantially flat plate portions of the case main body.

By employing such a configuration, for example, compared to the case where the reinforcement portion is provided near the pair of substantially flat plate portions, it is possible to suppress a decrease in the number of hollow fiber membranes to be accommodated in the case main body, it is possible to suppress the obstruction of the flow of the fluid flowing outside the hollow fiber membranes, and it is possible to effectively suppress the deformation of the case main body.

The above configurations can be employed in combination as far as possible.

Advantageous Effects of the Disclosure

As described above, according to the present disclosure, it is possible to suppress the deformation of a case main body even when the case main body made of a resin is employed.

DETAILED DESCRIPTION

A mode for carrying out this disclosure will be exemplarily described in detail below on the basis of an embodiment with reference to the drawings. However, unless otherwise specified, the dimensions, materials, shapes, relative arrangement of components described in this embodiment are not intended to limit the scope of the present disclosure only to them.

Embodiment

Figure 1:
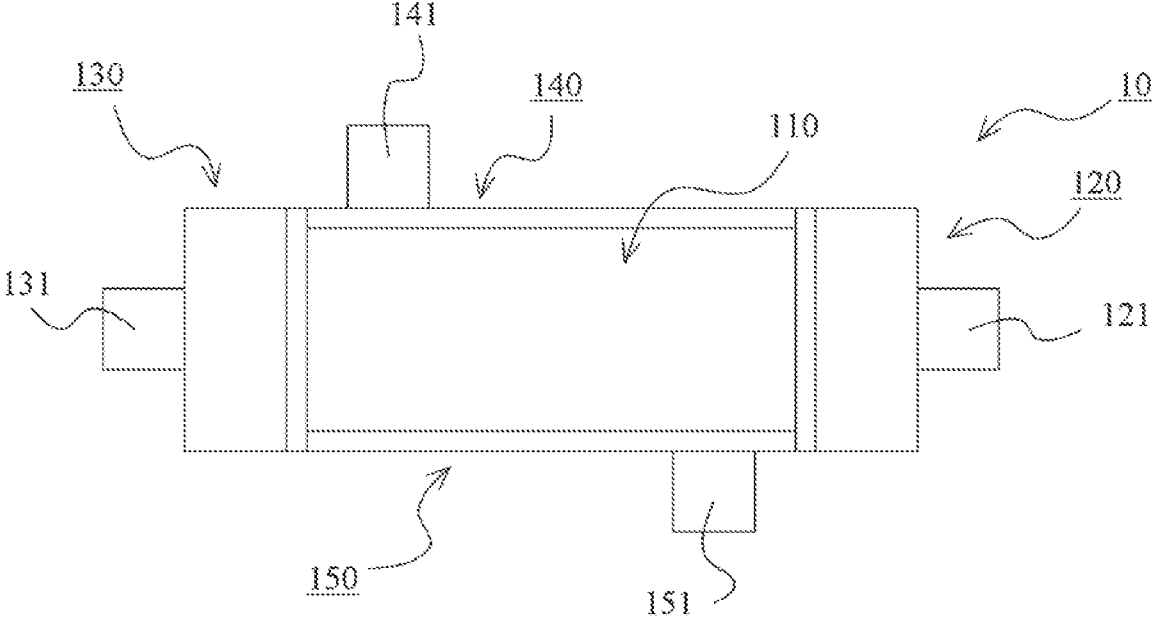
FIG. 1 is a side view of a hollow fiber membrane module according to an embodiment of the present disclosure.
Figure 2:
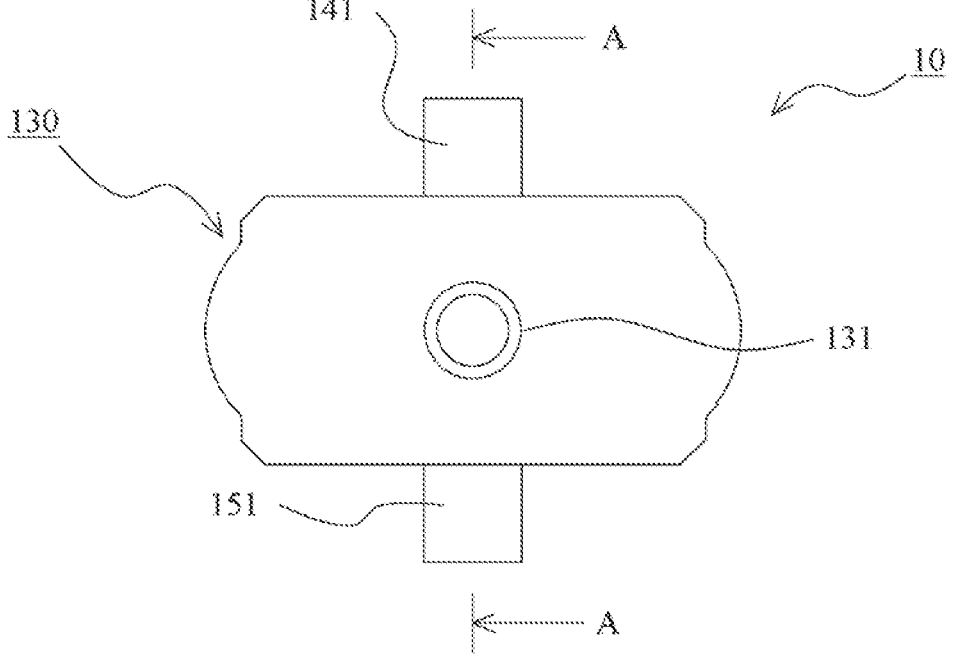
FIG. 2 is a front view of the hollow fiber membrane module according to the embodiment of the present disclosure.
Figure 3:
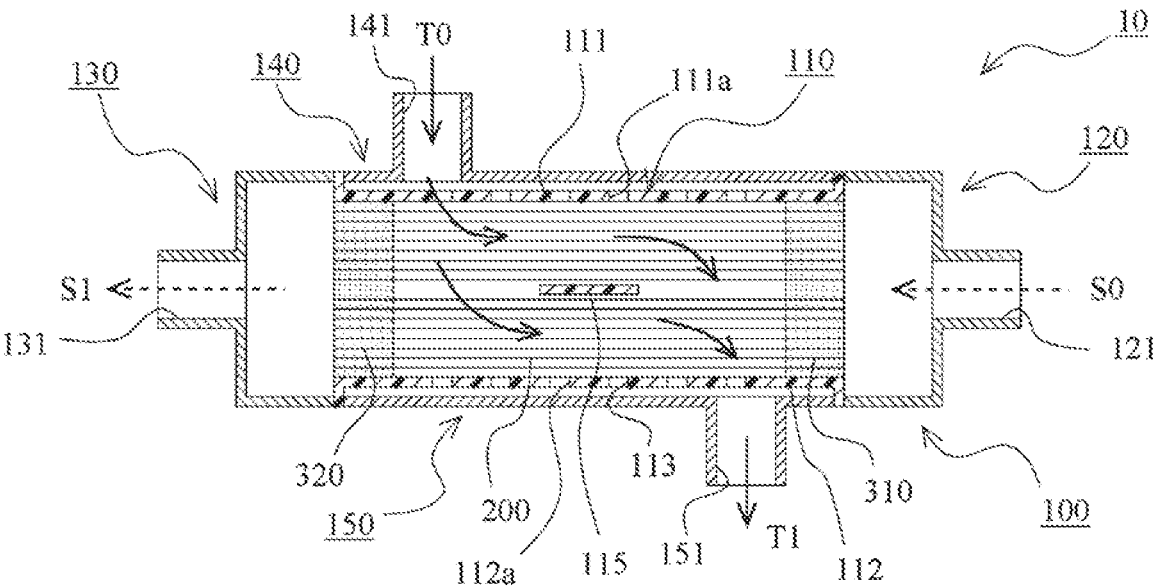
FIG. 3 is a schematic cross-sectional view of the hollow fiber membrane module according to the embodiment of the present disclosure.
Figure 4:
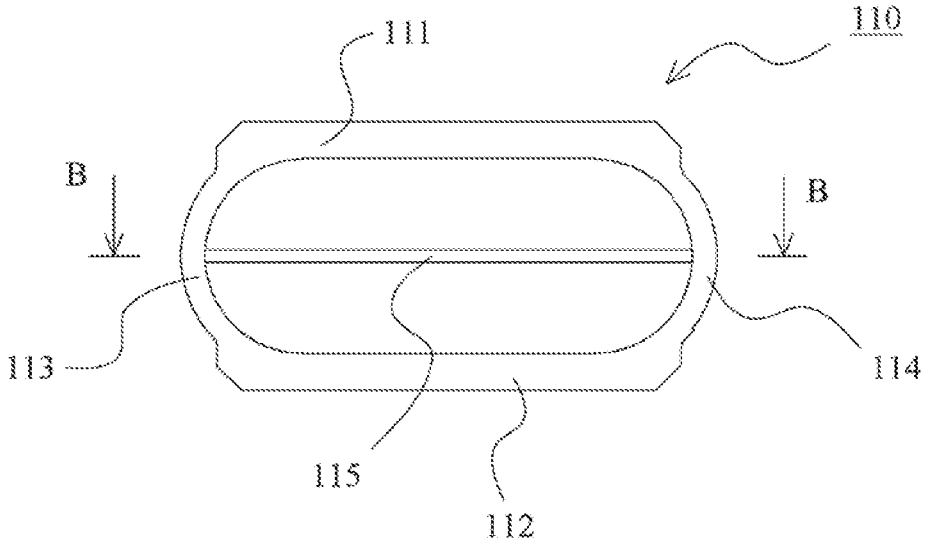
FIG. 4 is a front view of a case main body according to the embodiment of the present disclosure.
Figure 5:
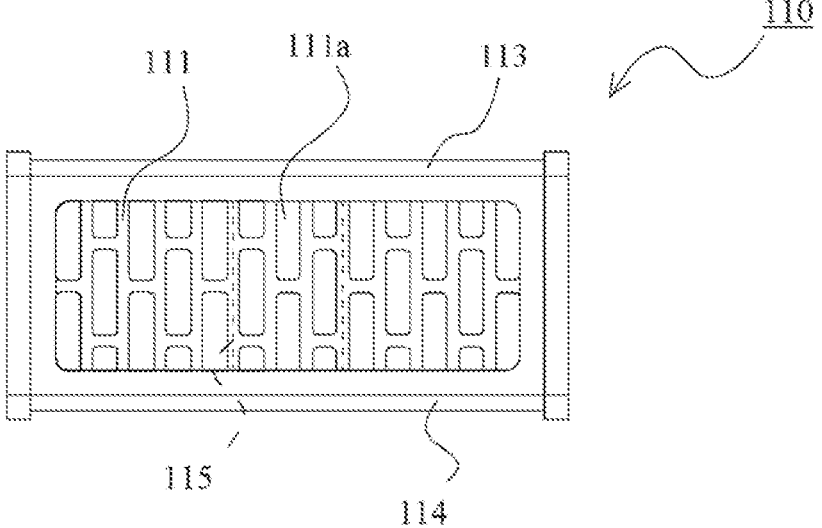
FIG. 5 is a plan view of the case main body according to the embodiment of the present disclosure.
Figure 6:
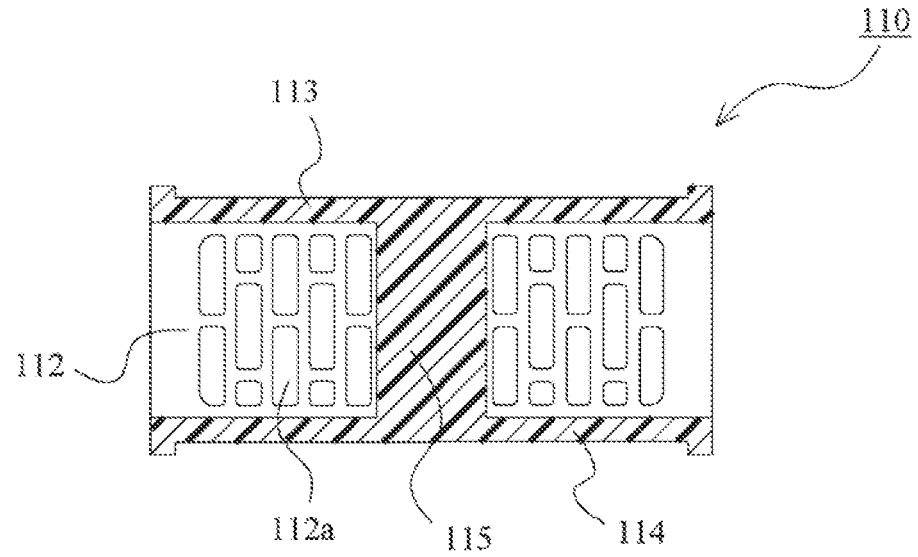
FIG. 6 is a schematic cross-sectional view of the case main body according to the embodiment of the present disclosure.

A hollow fiber membrane module according to an embodiment of the present disclosure will be described with reference to FIGS. 1 to 6. FIG. 1 is a side view of the hollow fiber membrane module according to the embodiment of the present disclosure. FIG. 2 is a front view of the hollow fiber membrane module according to the embodiment of the present disclosure. FIG. 3 is a schematic cross-sectional view of the hollow fiber membrane module according to the embodiment of the present disclosure and is a cross-sectional view along A-A in FIG. 2. FIG. 4 is a front view of a case main body according to the embodiment of the present disclosure. FIG. 5 is a plan view of the case main body according to the embodiment of the present disclosure. FIG. 6 is a schematic cross-sectional view of the case main body according to the embodiment of the present disclosure and is a cross-sectional view along B-B in FIG. 4.

<Application Example of Hollow Fiber Membrane Module>

An application example of a hollow fiber membrane module 10 according to the present embodiment will be described. The hollow fiber membrane module 10 according to the present embodiment can be applied as a humidifier or a dehumidifier. This point will be briefly explained. The hollow fiber membrane module 10 has a plurality of hollow fiber membranes 200 inside a case 100. The hollow fiber membrane module 10 is configured such that a flow path passing through the outside of the plurality of hollow fiber membranes 200 and a flow path passing through the inside of the membrane are formed. With such a configuration, for example, by supplying a wet gas to the outside of the hollow fiber membranes 200 and supplying a dry gas to each hollow inside of the plurality of hollow fiber membranes 200, the moisture in the wet gas moves to the dry gas side due to the membrane separation action of the hollow fiber membranes 200. Therefore, the dry gas is humidified and the wet gas is dehumidified, and thus the hollow fiber membrane module can be used as both a humidifier and a dehumidifier.

The hollow fiber membrane module 10 according to the present embodiment can be suitably used as a humidifier for humidifying an electrolyte membrane provided in a fuel cell. In this case, wet air generated in the fuel cell is used as the wet gas. The humidified gas (air) is supplied to the electrolyte membrane provided in the fuel cell, and thus the electrolyte membrane is maintained in a wet state. Here, as a material of the hollow fiber membrane 200, for example, polyphenylsulfone (PPSU) having a property of causing moisture to permeate therethrough by a capillary condensation mechanism due to the control of a pore size can be preferably used. Spinning is performed using a membrane-forming solution obtained by adding the PPSU and a hydrophilic polymer (polyvinyl porrolidone) to a solvent when the membrane-forming solution (a raw material of the hollow fiber membrane) is adjusted, and thus the hollow fiber membrane having hydrophilicity can be obtained. In addition, Nafion (a registered trademark) which is a hydrophilic material having a property of causing moisture to permeate therethrough by dissolution and diffusion can also be used. The materials described above have a low elution property and a high strength, and therefore can be suitably used for humidifiers and dehumidifiers.

<Hollow Fiber Membrane Module>

The hollow fiber membrane module 10 according to the present embodiment will be described in more detail. The hollow fiber membrane module 10 includes a case 100, a plurality of hollow fiber membranes 200 arranged inside the case 100, and a pair of sealing and fixing portions 310 and 320. The case 100 accommodates the plurality of hollow fiber membranes 200 and has a case main body 110 made of a resin and having openings at both ends.

The case main body 110 includes a pair of substantially flat plate portions 111 and 112 and a pair of curved portions 113 and 114 connecting both sides of the pair of substantially flat plate portions 111 and 112. The case main body 110 is formed of a member of which a cross-sectional shape perpendicular to a direction from one end side to the other end side of the case main body 110 is an oval shape. At least one (in the present embodiment, a plurality of) through hole 111*a* or 112*a* through which a fluid passes is provided in each of the pair of substantially flat plate portions 111 and 112. Further, in the case main body 110, a reinforcement portion 115 that connects a pair of facing wall surfaces of inner wall surfaces for accommodating the plurality of hollow fiber membranes 200 is integrally provided on the pair of wall surfaces. More specifically, this reinforcement portion 115 is provided to connect the inner wall surfaces of the pair of curved portions 113 and 114. The reinforcement portion 115 is provided in a center (a partial region including the center) between one end side and the other end side of the case main body 110 and in a center (a partial region including the center) between the pair of substantially flat plate portions 111 and 112 of the case main body 110. The case main body 110 formed as described above can be molded with a mold using a resin material such as polysulfone (PSU), polyphenylene sulfide (PPS), and polyphthalamide (PPA). Therefore, the pair of substantially flat plate portions 111 and 112, the pair of curved portions 113 and 114, and the reinforcement portion 115 are integrated.

Further, the case 100 includes a first fixing member 120 and a second fixing member 130 fixed to both ends of the case main body 110 and a pair of third fixing members 140 and fourth fixing member 150 provided to cover the pair of substantially flat plate portions 111 and 112. A method of fixing the first fixing member 120, the second fixing member 130, the third fixing member 140, and the fourth fixing member 150 to the case main body 110 is not particularly limited, and various known fixing methods such as screw fastening can be employed. Further, the first fixing member 120, the second fixing member 130, the third fixing member 140, and the fourth fixing member 150 can also be formed of a resin material (a resin molded product).

The first fixing member 120 and the second fixing member 130 are provided with pipe portions 121 and 131 each of which serves as an inlet or an outlet for a fluid flowing through the inside (the hollow inside) of the hollow fiber membrane 200. Further, the third fixing member 140 and the fourth fixing member 150 are provided with pipe portions 141 and 151 each of which serves as an inlet or an outlet for a fluid flowing outside the hollow fiber membrane 200. The third fixing member 140 and the fourth fixing member 150 are fixed to the case main body 110 such that one of the pipe portions 141 and 151 is arranged on one end side of the case main body 110 and the other the pipe portions 141 and 151 is arranged on the other end side of the case main body 110.

The pair of sealing and fixing portions 310 and 320 is formed to seal a gap between the hollow fiber membranes in a state where the hollow inside of each hollow fiber membrane 200 is kept open and to fix the plurality of hollow fiber membranes 200 to case 100 on both end sides of the case 100. The pair of sealing and fixing portions 310 and 320 are obtained by curing a potting material such as epoxy resin.

An example of a case where the hollow fiber membrane module 10 formed as described above is applied as a humidifier or a dehumidifier will be described with reference to FIG. 3. For example, when a wet gas is supplied from the pipe portion 141 of the third fixing member 140 to the inside of the case 100 (an arrow TO), the wet gas passes through the outside of the hollow fiber membrane 200 and flows out of the case 100 from the tube portion 151 of the fourth fixing member 150 (an arrow T1). Further, when a dry gas is supplied from the pipe portion 121 of the first fixing member 120 to the inside of the case 100 (a dotted line arrow S0), the dry gas is supplied from the sealing and fixing portion 310 on the one end side to each hollow inside of the plurality of hollow fiber membranes 200 and flows through the inside of each of the hollow fiber membranes 200. After that, the dry gas is discharged from the sealing and fixing portion 320 on the other end side and flows out of the case 100 from the pipe portion 131 of the second fixing member 130 (an arrow S1). In the above process, due to the membrane separation action of the hollow fiber membranes 200, the moisture in the wet gas moves to the dry gas side, the dry gas is humidified, and the wet gas is dehumidified.

<Excellent Points of Hollow Fiber Membrane Module According to the Present Embodiment>

According to the hollow fiber membrane module 10 of the present embodiment, since the case main body 110 is provided with the reinforcement portion 115, even if a fluid pressure in the case main body becomes high, it is possible to suppress the deformation of the case main body 110. Therefore, it is possible to suppress deterioration in sealing performance and suppress the leakage of the fluid. As a result, it is possible to suppress deterioration in humidification performance and dehumidification performance. In addition, even in a case where the case 100 is required to be large, it is possible to manufacture the case main body 110 by mold molding with a resin, and thus it is possible to reduce the cost compared to the case where the case main body 110 is manufactured by cutting a metal material.

Further, the reinforcement portion 115 according to the present embodiment is provided in a center between one end side and the other end side of the case main body 110 and in a center between the pair of substantially flat plate portions 111 and 112 of the case main body 110. By employing such a configuration, it is possible to suppress a decrease in the number of hollow fiber membranes 200 to be accommodated in the case main body, it is possible to suppress the obstruction of the flow of the fluid flowing outside the hollow fiber membranes 200, and it is possible to effectively suppress the deformation of the case main body 110.

REFERENCE SIGNS LIST

10 Hollow fiber membrane module
100 Case

110 Case main body
111, 112 Flat plate portion
111a, 112a Through hole
113, 114 Curved portion
115 Reinforcement portion
120 First fixing member
121 Pipe portion
130 Second fixing member
131 Pipe portion
140 Third fixing member
141 Pipe portion
150 Fourth fixing member
151 Pipe portion
200 Hollow fiber membrane
310, 320 Sealing and fixing portion

The invention claimed is:

1. A hollow fiber membrane module comprising:
a plurality of hollow fiber membranes;
a case that accommodates the plurality of hollow fiber membranes and has a case main body made of a resin and having openings at both ends thereof; and
a pair of sealing and fixing portions that seal a gap between the hollow fiber membranes in a state, where a hollow inside of each of the hollow fiber membranes is kept open, and fix the plurality of hollow fiber membranes to the case on both end sides of the case, wherein:
in the case main body, a reinforcement portion that connects a pair of facing wall surfaces of inner wall surfaces for accommodating the plurality of hollow fiber membranes is integrally provided on the pair of wall surfaces; and
the reinforcement portion has a shape of a plate spreading in a direction extending between the both ends of the case.

2. The hollow fiber membrane module according to claim 1, wherein the reinforcement portion is provided in a center between one end side and another end side of the case main body.

3. A hollow fiber membrane module comprising:
a plurality of hollow fiber membranes;
a case that accommodates the plurality of hollow fiber membranes and has a case main body made of a resin and having openings at both ends thereof; and
a pair of sealing and fixing portions that seal a gap between the hollow fiber membranes in a state, where a hollow inside of each of the hollow fiber membranes is kept open, and fix the plurality of hollow fiber membranes to the case on both end sides of the case, wherein:
in the case main body, a reinforcement portion that connects a pair of facing wall surfaces of inner wall surfaces for accommodating the plurality of hollow fiber membranes is integrally provided on the pair of wall surfaces,
the case main body includes a pair of substantially flat plate portions each provided with at least one through hole, through which a fluid passes, and a pair of curved portions connecting both sides of the pair of substantially flat plate portions, and is formed of a member, the cross-sectional shape of which perpendicular to a direction from one end side to the other end side of the case main body is an oval shape; and
the reinforcement portion is provided to connect inner wall surfaces of the pair of curved portions.

4. The hollow fiber membrane module according to claim 3, wherein the reinforcement portion is provided in a center between the pair of substantially flat plate portions of the case main body.

5. The hollow fiber membrane module according to claim 1, wherein the reinforcement portion has rectangular cross section with a pair of flat surfaces facing in a direction orthogonal to the plurality of hollow fiber membranes.

6. The hollow fiber membrane module according to claim 5, wherein the pair of flat surfaces extend in the direction connecting the both ends of the case.

* * * * *